Figure 1:
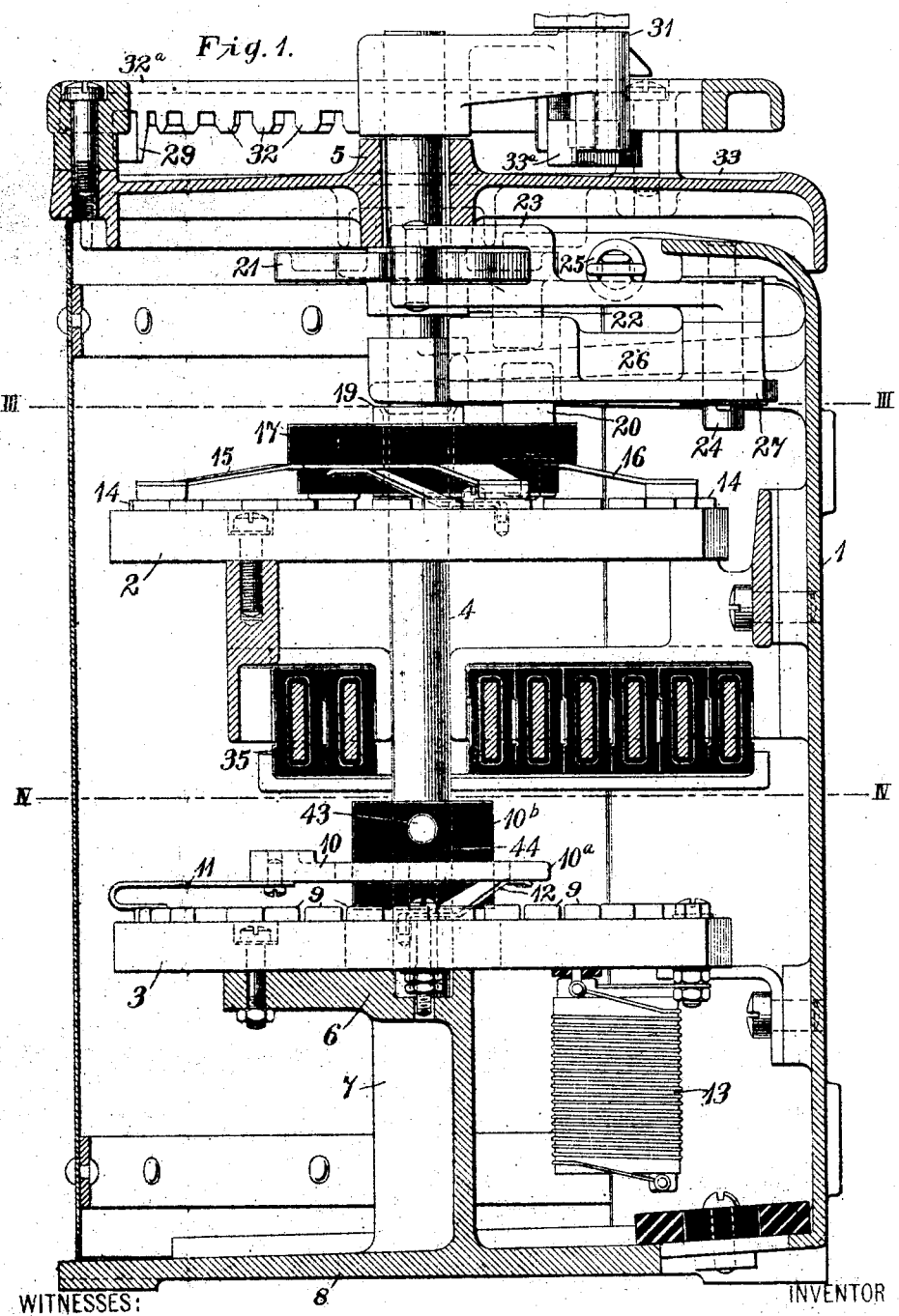

No. 883,200.

PATENTED MAR. 31, 1908.

H. D. JAMES.
CONTROLLER FOR ELECTRIC MOTORS.
APPLICATION FILED MAY 16, 1906.

5 SHEETS—SHEET 1.

WITNESSES:
Fred H Miller
R J Dearborn

INVENTOR
Henry D. James
BY
Wesley G Carr
ATTORNEY

No. 883,200.

PATENTED MAR. 31, 1908.

H. D. JAMES.
CONTROLLER FOR ELECTRIC MOTORS.
APPLICATION FILED MAY 16, 1906.

5 SHEETS—SHEET 5.

WITNESSES:
Fred H Miller
R J Dearborn

INVENTOR
Henry D James
BY
Kelsey G Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

No. 883,200.  Specification of Letters Patent.  Patented March 31, 1908.

Application filed May 16, 1906. Serial No. 317,228.

To all whom it may concern:

Be it known that I, HENRY D. JAMES, a citizen of the United States, and a resident of Pittsburg, in the county of Allegheny and State of Pennsylvania, have invented a new and useful Improvement in Controllers for Electric Motors, of which the following is a specification.

My invention relates to controllers for electric motors and particularly to such controllers as are adapted for use with compound or shunt wound motors.

The object of my invention is to provide a reversing controller for shunt or compound wound motors that shall be simple and durable in construction; that shall occupy a relatively small space and that shall govern both the armature and field of the motor by means of a single operating handle.

Reversing controllers which combine armature and field control have usually comprised either an armature control drum and a field rheostat or more than one operating handle.

According to my present invention I employ an armature-controlling device, of the general form shown and described in Patent No. 774,800, granted November 15, 1904, to Westinghouse Electric & Manufacturing Company, assignee of Hermon L. Van Valkenburg, which determines the direction of rotation of the motor and includes suitable resistance in series with the armature when the motor is started. In combination with this device, I employ a field rheostat of well known construction which is adapted to regulate the values of electric current traversing the shunt field magnet winding. The two controlling devices may be disposed in parallel planes and be operated by a shaft which is perpendicular to these planes and to which an operating handle, similar to that ordinarily employed with drum controllers, is attached. In this way, I obtain all the operating advantages of the drum controller and reduce its size, since the armature-controlling device occupies materially less space than the control drum ordinarily used.

My controller is not limited to any specific application or use, but it is particularly well adapted for use with relatively small shunt or compound wound motors such as are employed for driving machine tools. A movable contact arm of the field rheostat is driven directly by the operating shaft, and a multiple contact member of the armature-controlling device is connected to the same shaft by a lost-motion connection of such character that the first motion of the operating handle from its "off" position in either direction supplies energy to the motor armature in the one direction or the other, as the case may be, and starts the motor by connecting a suitable resistance in series with the armature and gradually reducing such resistance. As soon as this relatively short predetermined angle has been traversed, the aforesaid lost-motion connection serves to release the multiple contact member of the armature-controlling device. A further motion of the operating handle serves merely to decrease the field strength by connecting suitable resistance in series with the field magnet winding.

My invention is illustrated in the accompanying drawings in which

Figure 2:
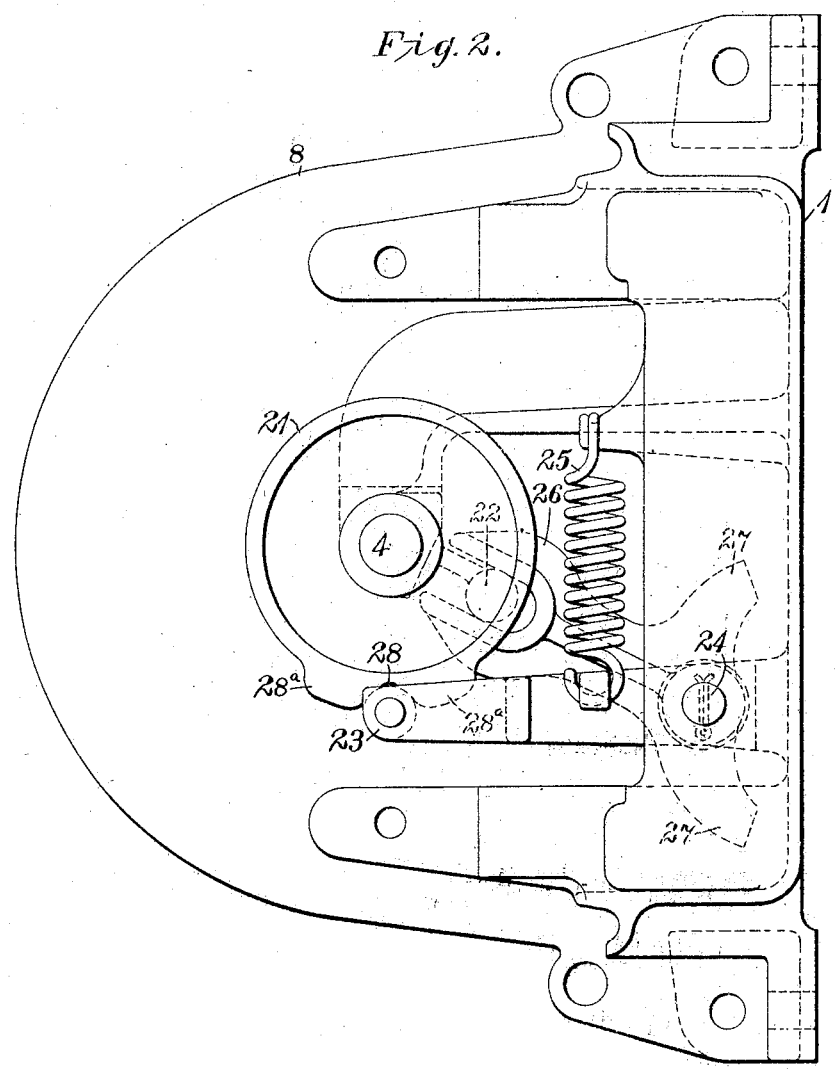
Figure 3:
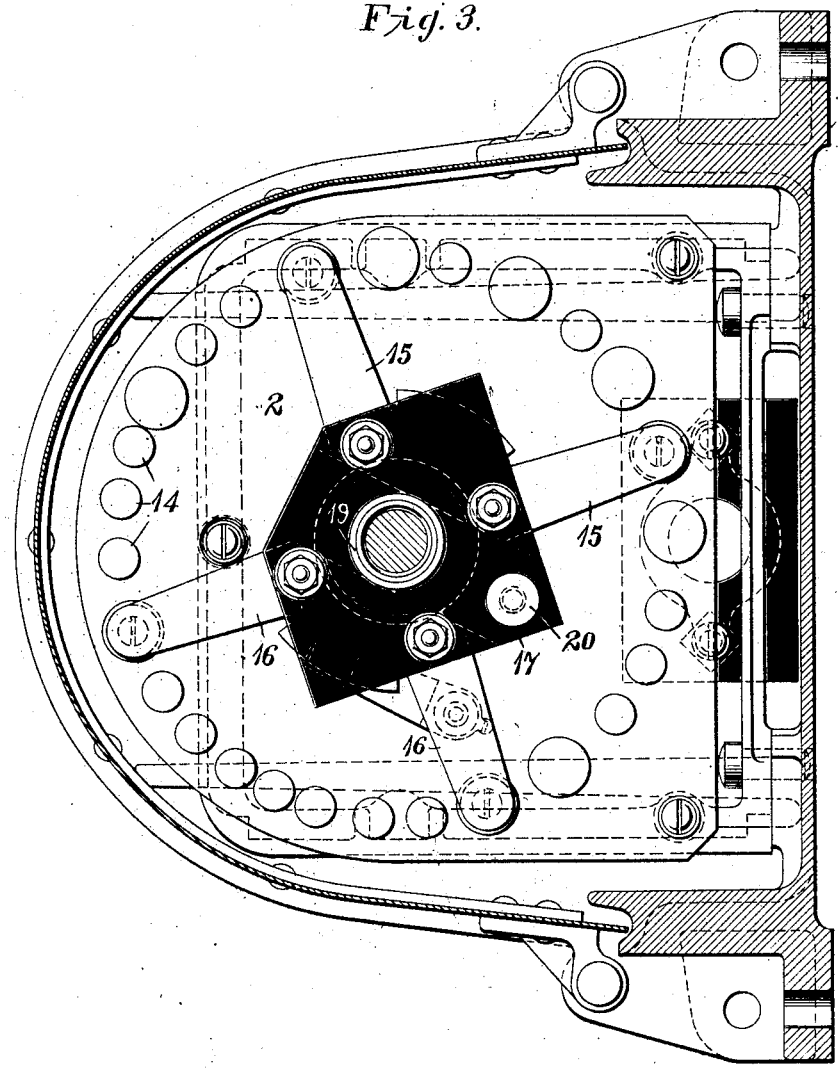
Figure 4:
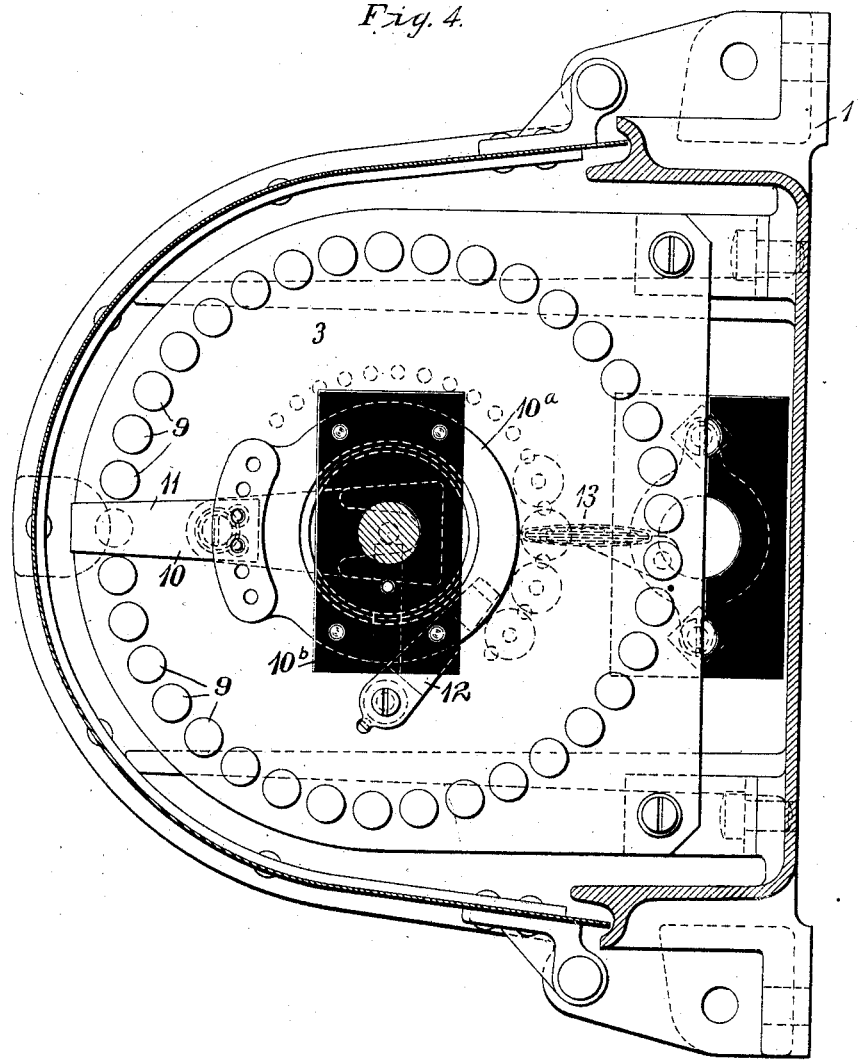
Figure 5:
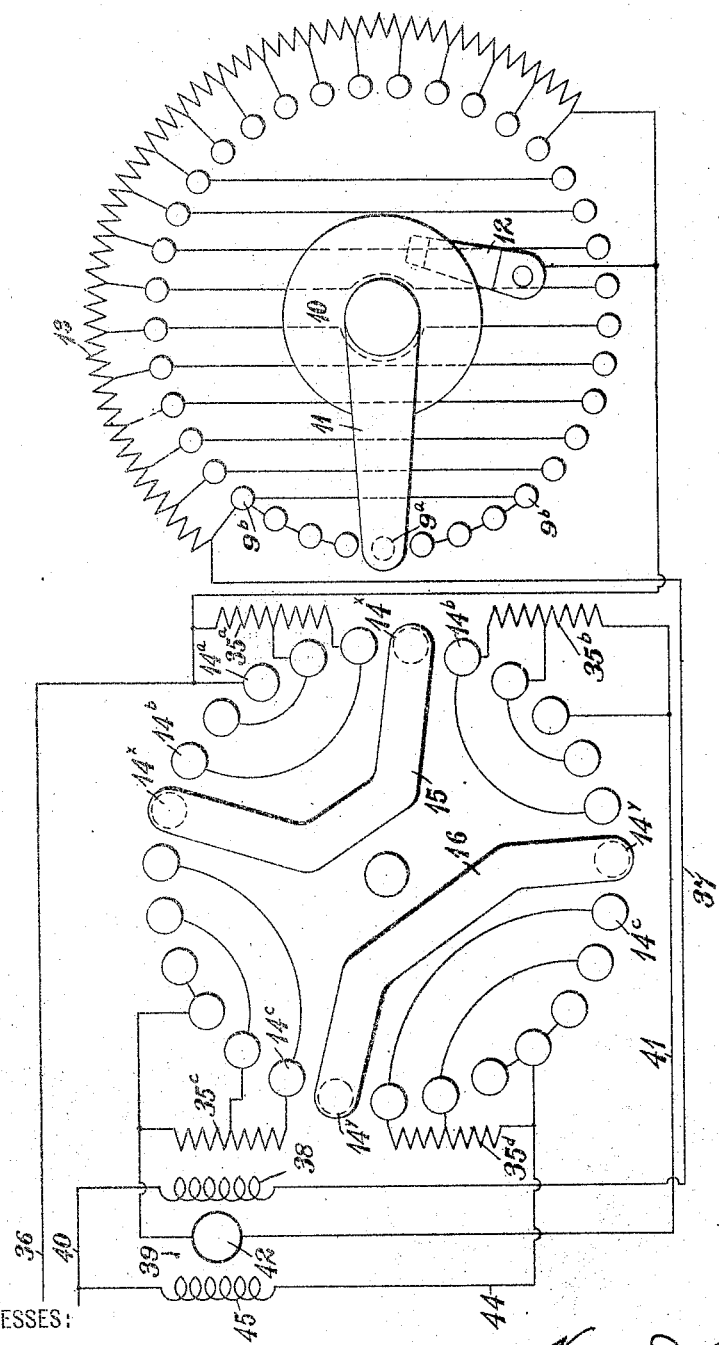

Figure 1 is a view, mainly in elevation but partially in section, of a controller constructed in accordance therewith; Fig. 2 is a plan view, with the cover removed, of the controller shown in Fig. 1; Fig. 3 is a sectional view on the line III—III of Fig. 1; Fig. 4 is a section on the line IV—IV of Fig. 1 and Fig. 5 is a diagrammatic view of a control system which discloses the circuit connections for the controller illustrated in Figs. 1, 2, 3 and 4.

Referring to the drawings, the controller here illustrated comprises a supporting frame 1, insulating slabs or plates 2 and 3 which are disposed in substantially parallel planes and are attached to the frame 1, and an operating shaft 4 which is substantially perpendicular to the insulating plates 2 and 3 and is rotatably mounted in an upper bearing 5 and a lower bearing 6. The lower plate 3 is bolted to a standard 7 with which the base plate 8 of the frame 1 is provided, and upon the plate 3 is mounted an annular set of stationary contact terminals 9. A movable contact member 10 is keyed to the shaft 4 near its lower extremity and comprises a flexible contact finger 11 which is adapted to engage and make electrical contact with the terminals 9 as the shaft 4 is rotated, a collector ring portion $10^a$ and an insulating center block $10^b$. The contact finger 11 is adjustably attached to the collector ring $10^a$ so that variations of the field strength for the given controller positions may be effected. This feature was not invented by me but is here shown and described as a desirable adjunct to a controller which embodies my invention. The inside diameter of the collector ring $10^a$ is considerably larger than the outside diameter of the shaft 4 and is insulated therefrom by the block $10^b$ to which it is attached. The ring $10^a$ is engaged by a stationary flexible contact finger 12 which is attached to the insulating plate 3 and through which electrical connection may be effected between the member 10 and a line conductor. Between adjacent contact terminals of the set 9, any suitable resistance material may be connected. As here shown, each resistance section 13 comprises a resistance wire wound upon a frame formed by covering a corrugated piece of sheet metal with insulating material, such as asbestos. The insulating plate 2 is similarly provided with contact members 14 which are engaged by the extremities of two double contact arms 15 and 16 that are attached to an insulating block 17. In this way, the two arms are electrically separated but mechanically connected. The arrangement of contact terminals 14 on the insulating plate 2 is such that all the contact arms simultaneously engage contact terminals.

The insulating block 17 is provided with a bushing 19 which is fitted to the shaft 4 and an eccentric pin 20 which projects for a short distance above the block in a line that is substantially parallel to the center of the shaft 2. A short distance above the insulating block 17, a ratchet wheel or cam 21 is rigidly fixed to the shaft 4 and has a projecting pin 22, which is in alinement with the pin 20 in the "off" position of the controller, and a notched periphery which is adapted to be engaged by a pawl 23. The pawl 23 is fulcrumed upon a stationary shaft 24 at one extremity and is held in engagement with the surface of the ratchet wheel 21 at its outer extremity by means of a spring 25. An operating lever 26 is also fulcrumed upon the shaft 24 and the degree of movement of which, in each direction, is limited by arms 27 which come into engagement with the frame 1. The free extremity of the lever is forked and is adapted to engage the pins 20 and 22 when it is in its mid-position. This position corresponds to the "off" position of the drum and is accentuated by a notch 28 in the ratchet wheel 21. The approach to this position from either direction is called to the attention of the operating attendant by projections $28^a$ at the sides of the notch in order that the motor may not inadvertently be reversed when it is desirable to bring it to rest suddenly.

Since the insulating block 17 and the contact arms 15 and 16 are not fixed to the shaft 4, but are rotatably mounted thereon, the rotation of the shaft will only effect the rotation of the contact member through a predetermined arc in either direction from the "off" position in which the operating lever 26 engages the pins 20 and 22, the pin 22 being a part of the ratchet wheel 21 which is fixed to the shaft 4.

The shaft 4 may be rotated through its entire range of movement in either direction, as determined by stops 29, only one of which is shown, by means of a handle lever 31 which is fastened to the upper extremity of the shaft. The several field control positions of the handle are accentuated by notches 32 on a ring member $32^a$ which is mounted on a cover plate 33. These notches are successively engaged by a pawl $33^a$ in the handle lever as the controller passes through its arc of movement.

Although the rotation of the contact arms 15 and 16 is limited to a relatively small arc in either direction, the contact arm 10, which is fixed to the shaft 4, is only limited by the stops 29. In order to maintain the strength of the field magnet winding when the motor is being started, the contact terminals 9 which are engaged by the engaging contact arm 11 during the travel of the multiple arm 15, are connected together without resistance. Suitable starting resistance, such as resistance bars 35, may be disposed below the insulating plate 2 so that the resistance leads may readily be connected to screw projections from the terminal 14.

The circuit connections for the controller may be more readily understood from Fig. 5 of the drawings to which special reference may now be had. Electrical energy may be supplied from any convenient source through positive line conductor 36 to contact terminal $14^a$, to one extremity of a resistance section $35^a$, to stationary contact finger 12 and to one extremity of the resistance 13. When the controller is in its "off" position, contact arm 15 engages contact terminals $14^x$, the contact arms 16 the terminals $14^y$ and the contact arm 11 engages the contact terminal $9^a$ which is midway between end terminals $9^b$, both of which are connected to one extremity of the resistance 13. This extremity of the resistance is also connected by a conductor 37 to a shunt field magnet winding 38 of a motor 39, the opposite terminal of this winding being connected to a negative line conductor 40.

As the controller moves to the next position, in a clockwise direction, the arm 15 moves from engagement with the terminals $14^x$ to engagement with terminals $14^b$ and the contact arm 16 moves into engagement with terminals $14^c$. When the controller occupies this position, energy is supplied from the positive line conductor 36 through resistance section $35^a$, contact arm 15, resistance section $35^b$, conductor 41 armature 42 of the motor 39, resistance section $35^c$, contact arm 16, resistance section $35^d$, conductor 44 and a series field magnet winding 45 to the negative tive line conductor 40. As the controller passes through the next two positions in the same direction, the only changes effected will be the short-circuiting of the resistance sections 35ª, 35ᵇ, 35ᶜ and 35ᵈ, but if the controller is rotated one notch from the "off" position in a counter clockwise direction, circuit connections are completed from the positive line conductor 36 through resistance sections 35ª, 35ᶜ, armature terminal 43, armature terminal 42, resistance section 35ᵇ and resistance section 35ᵈ, from which point circuit is completed as before. Thus the direction of rotation of the operating handle from the "off" position determines the direction of flow of the current through the armature of the motor and consequently the direction of rotation of the motor.

The arrangement of parts is such that the contact arms 15 and 16, which are insulated from each other and are attached to the block 17, reach the end of their travel, as hereinbefore explained, when the resistance sections are short-circuited, and the arrangement of the field resistance 13 is such that the contact arm 11 comes into engagement with the contact terminals 9ᵇ just after the armature-controlling device has come to rest. As the controller passes through successive positions in either direction, the portion of the resistance 13 included in circuit with the field magnet winding 38 is increased. This increase in the resistance of the field circuit serves to decrease the current traversing the field magnet winding and consequently tends to increase the speed of the motor.

The center block 10ᵇ is provided with a plug 43 which engages a keyway 44 in the lower end of the shaft and the arrangement of parts is such that, by removing the detachable cover plate, the shaft 4, together with the ratchet wheel or cam 21, may be pulled out, consequently permitting the removing of the field or armature control devices for repairs.

Although I have shown and described a specific arrangement I desire that variations which do not depart from the spirit of my invention shall be included within its scope, and although the controlling device is illustrated in connection with a compound wound motor, its use is obviously not restricted thereto, but may include other well known types of motors.

I claim, as my invention:

1. A controller for electric motors comprising a field rheostat, an armature-reversing faceplate member, a single operating handle, a rheostat arm rigidly connected to said handle, and a contact arm for said faceplate member having a lost-motion connection with said handle.

2. A controller comprising a field rheostat, an armature-reversing faceplate member, a single operating handle and suitable contact arms having a rigid and a lost-motion connection therewith, respectively.

3. In a controller, the combination with an annular set of stationary contact terminals, and a pair of rigidly connected but electrically independent contact arms to engage said contact terminals, of a field rheostat and a single operating handle for the movable contact arms and the field rheostat.

4. In a controller, the combination with a pair of stationary insulating plates disposed in substantially parallel planes, stationary contact terminals circumferentially arranged on each insulating plate, a rotatable shaft substantially perpendicular to the planes of the insulating plates, a contact arm projecting from said shaft to engage one set of contact terminals, and a multiple contact arm the extremities of which are adapted to engage the other set of contact terminals, of a lost-motion connection between said shaft and said multiple contact arm.

5. In a controller for electric motors, the combination with an annular set of stationary contact terminals, a pair of rigidly connected but electrically independent contact arms to engage said contact terminals, a second set of stationary contact terminals similarly disposed in a plane parallel to that of the first set, and a single movable contact arm therefor, of a rotatable shaft for said movable contact arms, and means for temporarily disconnecting said pair of contact arms from said shaft after the shaft has been rotated through a predetermined angle in either direction from the "off" position of the controller.

6. In a controller, the combination with a driving shaft, a single operating handle lever attached thereto, a pair of insulating plates disposed at right angles to the shaft, and stationary contact terminals mounted on the plates, of movable contact arms to engage said contact terminals, one of which is fixed to said shaft and the other of which is connected thereto by a lost-motion connection.

7. In a controller, the combination with a driving shaft, a handle lever attached thereto, insulating plates disposed at right angles to the shaft, sets of stationary contact terminals mounted on said plates, a movable engaging arm projecting from the shaft to engage one set of contact terminals, and a pair of rigidly connected contact arms adapted to engage the other set of stationary contact terminals and connected to said shaft by a lost-motion connection, of means for rotating said contact arms through a relatively short angle from a predetermined position at the beginning of the operating-handle travel.

8. In a controller, the combination with a driving shaft, a handle lever attached thereto, insulating plates disposed at right angles to the shaft, sets of stationary contact terminals mounted on said plates, a movable engaging arm projecting from the driving shaft to engage one set of contact terminals, and a pair of rigidly connected contact arms adapted to engage the other set of stationary contact terminals and connected to said shaft by a lost-motion connection, of means for rotating said contact arms when the shaft is rotated and for confining the motion of the contact arm to a predetermined angle.

9. In a controller, the combination with a rotatable shaft, and an operating handle therefor, means for accentuating the positions which the controller is adapted to occupy, a cam fixed to the shaft, a pair of stationary contact terminal bearing plates perpendicular to the shaft, resistances connected between said contact terminals, a single movable contact arm projecting from the shaft to engage one set of contact terminals, and a pair of rigidly connected contact arms to engage the other set of contact terminals, and an insulating support rotatably mounted independently of the shaft, of means for rotating said pair of arms and their support through a predetermined angle as the single contact arm is moved substantially through one revolution.

10. In a controller, the combination with a rotatable shaft, an operating handle therefor, means for accentuating the positions which the controller is adapted to occupy, a cam fixed to the shaft, a pair of stationary contact terminal bearing plates perpendicular to the shaft, resistances connected between said contact terminals, a single contact arm projecting from the shaft to engage one set of contact terminals, a pair of rigidly connected contact arms for the other set of contact terminals, and an insulating support rotatably mounted independently of the shaft, of a lost-motion connection between the said insulating support and the shaft, whereby rotation of the shaft in either direction actuates the pair of arms only through a predetermined angle which is materially less than the angle traversed by the shaft and the single contact arm projecting therefrom.

11. A controller comprising a field rheostat, an armature-reversing faceplate member, movable contact members, and a single removable operating shaft for the movable contact members.

12. In a controller for electric motors, the combination with a field rheostat, an armature-controlling device, movable contact members, and a single actuating shaft for the movable contact members having a keyway at one end, of an operating handle attached to the other end of the shaft, and a pin in one of the movable members which engages the keyway.

13. In a controller for electric motors, the combination with a field rheostat, an automatic controlling device, movable contact members, and a single actuating shaft for the movable contact members having a keyway at one end, of an operating handle attached to the other end of the shaft, a pin in one of the movable members which engages the keyway, and a lost-motion connection between the shaft and the other movable member.

14. In a controller, the combination with a driving shaft having a keyway, a handle lever attached to said shaft, insulating plates disposed at right angles to the shaft, stationary contact terminals mounted on said plates, an arm provided with a projection to engage the keyway in the shaft and adapted to engage one set of contact terminals, and a pair of rigidly connected contact arms adapted to engage the other set of stationary contact terminals and connected to said shaft by a lost-motion connection, of means for rotating said pair of contact arms when the shaft is rotated and for confining the motion thereof to a predetermined angle.

15. In a controller, the combination with a field rheostat, an armature-reversing faceplate member, and movable contact members therefor, of a single operating handle for the movable contact members, a yielding pawl in the handle, and a notched ring member to be engaged by the pawl.

16. In a controller for electric motors, the combination with a field rheostat, an armature-controlling device, movable contact members therefor, and a single operating shaft for the members, of an operating handle attached to one end of the shaft, a lost-motion connection between one of the contact members and the shaft, and means for accentuating the several controller positions, said means comprising a notched ring and a yielding pawl in the operating handle.

17. In a controller for electric motors, the combination with a field rheostat, an automatic controlling device, movable contact members therefor, a single actuating shaft for the movable members having a keyway at one end, an operating handle attached to the other end of the shaft, a pin in one of the movable members which engages the keyway, and a lost-motion connection between the shaft and the other movable member, of means for accentuating the several controller positions comprising a notched ring and a yielding pawl in the operating handle.

In testimony whereof, I have hereunto subscribed my name this 10th day of May, 1906.

HENRY D. JAMES.

Witnesses:
EDWIN LEHR,
BIRNEY HINES.